A. TOMASELLI.
MEASURING RULE FOR TAILORS.
APPLICATION FILED JULY 19, 1909.

959,972.

Patented May 31, 1910.

ATTEST
E. M. Fisher
J. C. Mussun

INVENTOR
Antonio Tomaselli.
BY Fisher & Moser
ATTYS.

UNITED STATES PATENT OFFICE.

ANTONIO TOMASELLI, OF CLEVELAND, OHIO.

MEASURING-RULE FOR TAILORS.

959,972.  Specification of Letters Patent.  Patented May 31, 1910.

Application filed July 19, 1909. Serial No. 508,284.

*To all whom it may concern:*

Be it known that I, ANTONIO TOMASELLI, subject of Italy, residing at Cleveland, in the county of Cuyahoga and State of Ohio, have invented certain new and useful Improvements in Measuring-Rules for Tailors, of which the following is a specification.

My invention relates to improvements in measuring rules for tailors, and the improvement consists in a rule constructed and arranged substantially as hereinafter shown and particularly pointed out in the claim.

The object of the invention is to provide a measuring rule for laying out a given sized pattern for a garment in the simplest manner and with convenience and despatch and also accuracy, and the markings of the rule are especially designed and arranged to permit reading thereof without confusion or mistakes.

Figure 1:
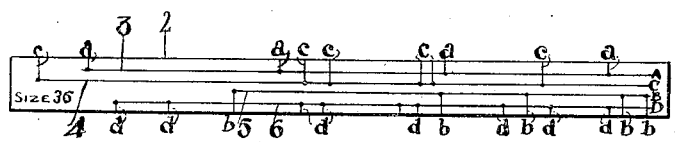
Figure 2:
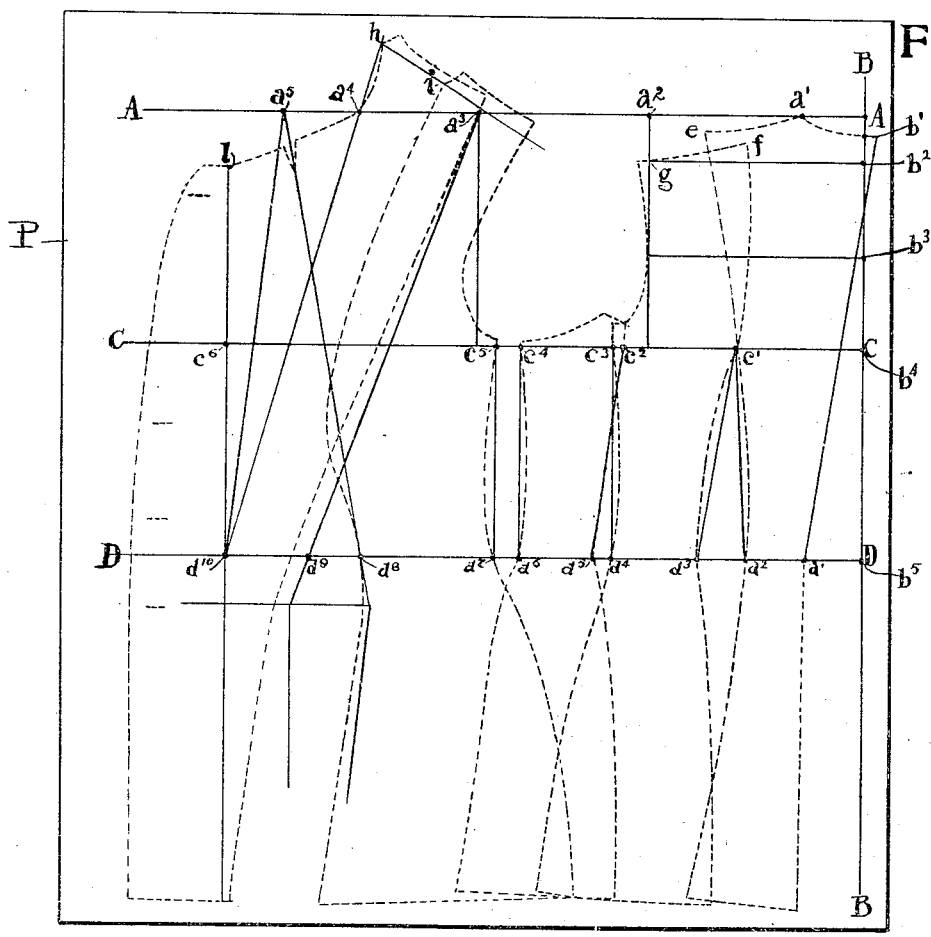
Figure 3:
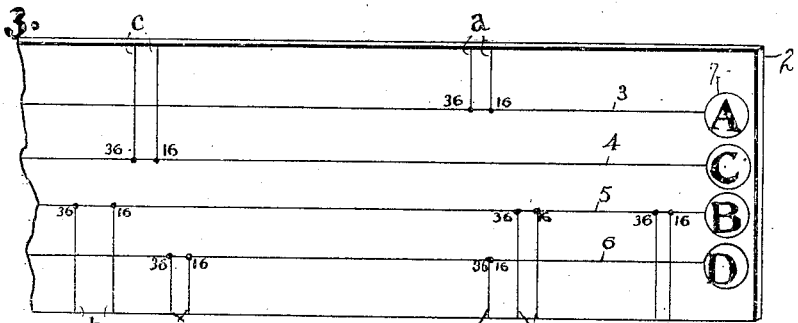

In the accompanying drawings, Figure 1 is a reduced face view of my improved rule or measure, and Fig. 2 is a view of a chart or pattern as laid out and completed by the use of my rule. Fig. 3 is a perspective view (approximately full size) of a portion of my improved rule or measure showing double markings thereon for dual uses.

As shown, the rule or measure 2 is preferably constructed in the form of a flat blade which may be made of stiff cardboard, celluloid, wood or metal. In use this blade is laid flat upon a sheet of paper and the pattern is ruled and pointed off therewith by following certain initial steps which are invariably alike and form the basis of the final draft of the pattern. To this end, the rule is provided with spaced marks $a$, $c$, $b$ and $d$ transversely of the blade at its opposite longitudinal edges, and these marks are arranged in separate series of different lengths. That is to say, marks $a$ and $d$ compared with $c$ and $b$ are of different lengths, the latter being relatively double the length of the former. All marks $a$ and $d$ are of the same length, and marks $c$ and $b$ are also alike as to length. This difference of length distinguishes the marks on the same longitudinal edges one from another but not sufficiently for quick reading thereof. Therefore, all the marks $a$ are connected by a single lead line 3 running parallel with the edge of the rule and terminating at the extreme right or end edge of the rule, and this is also true of the other marks $c$, $b$ and $d$ which are also separately connected by similar lead lines 4, 5 and 6, respectively arranged parallel with one another and the longitudinal edge of the rule and also terminating at the right where each is provided with a conspicuous designating character A, C, B and D, respectively. These characters are printed or otherwise permanently affixed upon the face of the rule and preferably at the extreme right at the end of each lead line, and in some instances I may encircle each character by a ring 7 as shown in Fig. 3 to more clearly indicate their connections.

Each of the transverse markings on the rule represents a predetermined point of marking for a pattern of a given size, and the rule shown in Fig. 1 is designated to make a single size of pattern of a predetermined style and form. But in Fig. 3 the idea is extended to include two sizes of patterns. Thus, the transverse marks numbered 36 represent size 36, and those numbered 16 represent size 16. Either may be selected, but when selected the same number is used throughout although the same proceeding is followed to lay out the pattern for both sizes. Thus, the first step taken is to lay out or rule line A—A horizontally of the paper sheet P and then a line is drawn at right angles to A—A as represented in Fig. 2 by vertical line B—B. Then using designating character B on rule 2 as a guide and laying the rule parallel with and next to line B—B and with the A—D end of the rule in abutting relation to line A—A, the next step is to pencil or prick the point $b'$ to $b^5$ inclusive, on the chart using marking lines $b$ on the rule as a guide. The next step is to rule the lines C—C and D—D on the chart parallel with each other and with line A—A, using the pencil or prick points $b^4$ and $b^5$ on the chart as guides. Now having these four lines relatively arranged and marked as described, each line A—A, C—C and D—D is pointed off by pencil or prick punch as shown by dots on said lines in Fig. 2, and according to the marks $a$, $c$, $d$, respectively as found on the rule and as represented by corresponding designating characters A, C and D at the end of the rule. Then using pencil or prick points as a guide, it is an easy matter to finish drafting of the pattern or rather the foundation of the pattern. This is done as follows: Using points $a^2$, $a^3$ on line A—A as a guide a vertical line is drawn from each between horizontal lines A and C. Then two horizontal lines are drawn at the left of line B, using points $b^2$ and $b^3$ as guides. Then a straight line is drawn from a point half an inch to the right of point $b'$ to lead to $d'$ on horizontal line D. Then an inclined line is drawn from point $c'$ on line C to point $d^2$ on line D, also another line from point $c'$ to point $d^3$. Then passing to the left two lines are drawn which cross each other between points $c^2$, $c^3$ and points $d^4$, $d^5$. The next lines to be drawn are the two substantially parallel lines between points $c^4$, $c^5$ and $d^6$ and $d^7$. The next line is drawn between point $a^4$ and $d^{10}$, then from $d^{10}$ to $a^5$, then again from $d^{10}$ to $c^6$. Now shifting to point $d^8$, mark a straight line to $a^5$ and then changing to point $d^9$ draw another line to point $a^3$. These lines now practically provide a foundation for the remaining steps in laying out the pattern, and further proceedings may vary according to any change of style or peculiar formation of the garment without change in fit as to essentials.

As shown in Fig. 2 the pattern proper is represented by dotted lines, and the method of procedure in laying out these lines which are largely curved to conform to the detailed requirements for a fit, is as follows: First a curved line is drawn between points $a'$ and $b'$ which forms the neck in the back. From the same point, $a'$, a slightly curved line is drawn which extends to the letter $e$. This represents the half shoulder. From that, a curved line is drawn which passes through point $c'$ to $d^2$, thus completing the back except for the portion beneath line D which is arbitrary. Now mark a compound curved line through point $c'$ starting from point $d^3$ and stopping at $f$, then draw a slightly curved line from point $f$ to point $g$ and a little beyond, which forms another half portion of the shoulder for the back. From point $g$, draw an irregular curve to a point slightly above point $c^3$ which will form the dip in the back. Then using point $c^3$ as a guide, draw an irregular curve therefrom to point $d^4$, this representing the hang in the back. For the hang in the front mark a curved line from point $c^4$ upward to the right and then mark a more or less irregular curved line to join therewith at a point above point $c^2$, said line starting at point $d^5$ and passing through point $c^2$. Also mark a curved line from point $c^4$ to point $d^6$ to complete this portion of the pattern.

Now taking up the front pieces of the pattern, lay the rule across the sheet from point $b^4$ and point $a^3$ and mark a straight inclined line to point $a^3$ upward to the left to bisect with an extension of the line extending from $d^{10}$ to $a^4$. Measure six and one-half inches on this inclined line from point $h$ passing through point $a^3$. At the end of this distance mark an irregular curve as shown approximately to point $c^5$. Then mark an irregular curve from point $c^5$ to $d^7$. Now draw a compound curved line, starting from point $d^8$ to point $i$ to represent the side of the front. For the front proper mark a curved line from point $a^3$ to the left of point $d^9$. Again, from point $a^3$ parallel the inclined line to $h$ by an irregular line as shown. Then mark an irregular curve through point $a^4$ to point $l$ which last point is located three inches beneath line A on the vertical line which passes through points $d^{10}$ and $c^6$. This curve represents the curve of the neck and front. From point $l$ the flap of the jacket is formed as shown in any desired form.

From the foregoing it will be seen that a simple system of laying out patterns for garments may be taught by the use of my improved rule as it is so simple in form and so easily read, and it is especially adapted for use by beginners and by teachers in the art of garment cutting and is not limited in its use to experienced tailors, and when familiar with its use, different styles and shapes of garments may be laid out by using the marks on the rule as a guide but not adhering strictly thereto. One marked advantage of the rule is in the time saved in accurately laying out patterns as compared with all other devices and systems known to me.

What I claim is:

A measuring rule for tailors having a plurality of parallel lead lines extending lengthwise of the blade, each having a distinguishing character different from that of the other or others and all said characters being grouped together transversely of the blade, and a plurality of series of transverse marks arranged in multiple at irregular distances along the edge of the rule and respectively extending from said lead lines to said edge, and the different series of marks being distinguished from one another by different characters at each mark.

In testimony whereof I affix my signature in presence of two witnesses.

ANTONIO TOMASELLI.

Witnesses:
E. M. FISHER,
R. B. MOSER.